United States Patent [19]

Hartmann et al.

[11] 4,046,932

[45] Sept. 6, 1977

[54] MAGNETIC RECORDING DISCS

[75] Inventors: Hans-Joerg Hartmann, Breinsheim; Roland Falk, Achern; Peter Gawlik, Ludwigshafen, all of Germany; Werner Balz, Bedford, Mass.; Karl Uhl, Frankenthal, Germany; Dieter Schaefer, Germany; Herbert Motz, both of Ludwigshafen, Germany

[73] Assignee: BASF Aktiengesellschaft, Ludwigshafen (Rhine), Germany

[21] Appl. No.: 656,182

[22] Filed: Feb. 9, 1976

Related U.S. Application Data

[63] Continuation of Ser. No. 460,469, April 12, 1974, abandoned.

[30] Foreign Application Priority Data

Apr. 17, 1973 Germany .............................. 2319363

[51] Int. Cl.$^2$ ............................................. H01F 10/02
[52] U.S. Cl. ...................................... 428/64; 427/129; 428/327; 428/329; 428/339; 428/418; 428/539; 428/900
[58] Field of Search ................ 427/127–132, 427/48; 428/900, 64, 418, 539, 329, 339, 327

[56] References Cited

U.S. PATENT DOCUMENTS

| 3,320,090 | 5/1967 | Graubart | 117/235 |
|---|---|---|---|
| 3,366,505 | 1/1968 | Bisschops et al. | 117/237 |
| 3,474,073 | 10/1969 | Higashi | 117/237 X |
| 3,560,388 | 2/1971 | Higashi | 117/235 X |
| 3,647,539 | 3/1972 | Weber | 117/237 |
| 3,689,317 | 9/1972 | Akashi et al. | 117/235 X |
| 3,781,210 | 12/1973 | Lohoff | 117/235 X |
| 3,821,025 | 6/1974 | Akashi et al. | 117/237 X |

Primary Examiner—Bernard D. Pianalto
Attorney, Agent, or Firm—Keil, Thompson & Shurtleff

[57] ABSTRACT

The invention relates to a process for the manufacture of improved magnetic discs by applying a thin layer of a liquid dispersion of magnetic pigments and optionally further, non-magnetic, pigments in a binder mixture to a non-magnetic rigid base, and curing the magnetic coating which has been applied. The binder used is a mixture of polycondensates comprising 60 to 70% by weight of a solid curable polycondensate of 2,2-bis(4-hydroxyphenyl)-propane and epichlorohydrin having an epoxy equivalent weight from about 400 to 2,500 and a melting point from about 50° to 150° C, 10 to 30% by weight of a curable allyloxybenzene-formaldehyde condensate of the resol type with free methylol groups or with methylol groups etherified with a lower alcohol, and having a molecular weight of less than 1,000, and 10 to 30% by weight of a curable melamine-formaldehyde condensate with more than two methylol groups etherified with n-butanol or iso-butanol, and having a molecular weight of less than 2,500. A magnetic dispersion using such a binder allows the application of a firmly adhering magnetic coating, even in thicknesses of less than 4 μ, to aluminum discs or pre-coated aluminum discs, and the magnetic coating produced has high resistance to mechanical wear.

6 Claims, No Drawings

MAGNETIC RECORDING DISCS

This is a continuation, of application Ser. No. 460,469 filed Apr. 12, 1974 and now abandoned.

This application discloses and claims subject matter described in German patent application No. P 23 19 363.7 filed Apr. 17, 1973, which is incorporated herein by reference.

The invention relates to a process for the manufacture of improve magnetic recording discs by applying a thin layer of a liquid dispersion of magnetic pigments and optionally further, non-magnetic, pigments in a binder mixture to a non-magnetic rigid base, and curing the magnetic coating which has been applied.

Magnetic recording media in the form of rotating discs are extensively being used as memories which allow rapid access to any desired position. Two important factors relating to such magnetic disc memories are the amount of information which can be stored therein, which is usually described as the recording density and is quoted in bits per inch, and their magnetic properties, which in turn influence the output signals of the magnetic disc. The achievable recording density depends on the thickness of the magnetic coating. The thinner the coating, the higher the recording density can be. With $6\mu$ magnetic coatings, a recording density of about 1,000 bits per inch is achieved whilst with $4\mu$ magnetic coatings the achievable recording density is about 2,000 bits per inch. However, there is a growing demand for magnetic discs which permit an even higher recording density whilst retaining a usable output signal. If very thin magnetic coatings are used, the heads, which fly on a layer of air which is present between the magnetic disc and the head, have to be brought into closer contact with the recording medium. In the case of magnetic discs, in particular, the consequence is frequently that the heads sharply strike the surface of the disc. In addition, dust particles or minute unevennesses in the magnetic coating can disturb the flying conditions and cause the head to strike the disc. If the surface hardness of the magnetic coating is inadequate, this leads to a high degree of wear of the discs and of the heads. The particles abraded from the magnetic coating in the event of such a landing or head crash frequently also remain sticking to the heads and can influence the aerodynamic properties of the heads so greatly that the heads no longer fly and the magnetic coating underneath the head becomes scratched. At the same time, the magnetic heads can become unusable, and the deformation of the surface of the magnetic coating which occurs at the crash points can cause the entire or partial loss of the information stored there.

It is known to manufacture magnetic discs by coating an aluminum disc with a liquid dispersion which contains a magnetizable material finely distributed in a polymeric binder, subsequently drying and/or curing this coating, and, if appropriate, also grinding and/or polishing it. A coating technique which has proved particularly successful is the so-called spin coating process in which the base disc is caused to rotate and the coating mixture is allowed to flow onto it, as is described, for example, in U.S. Pat. No. 3,198,657. Other known possible methods of applying the magnetic coating are based on immersing the base disc in the liquid coating mixture or on spraying the mixture onto the disc.

A large number of binders and binder mixtures has already been proposed for the production of magnetic coatings for magnetic discs. It is known from U.S. Pat. No. 2,914,480 to use a mixture of butylated melamine-formaldehyde resin with polyvinyl butyral as the binder for this purpose, but the mechanical resistance of the magnetic coatings produced therewith is not satisfactory. It is also known, from German Pat. No. 1,174,443 to use a solution of a mixture of an epoxy resin with a phenolic resin intermediate and with polyvinyl methyl ether for the production of magnetic coatings on aluminum discs. Whilst magnetic coatings produced therewith and magnetic coatings produced with a mixture of an epoxy resin with phenol-formaldehyde resins are more resistant than mixtures of epoxy resins with melamine-formaldehyde resins to the mechanical conditions to which a magnetic disc is exposed on the drive unit, extremely thin coatings of less than $4\mu$, and especially of about $2\mu$, cannot be produced free of defects from such mixtures by the usual coating technique, so that magnetic discs with unsatisfactory flight properties frequently result.

It is the object of the present invention to provide, within the framework of the customary method of production of magnetic coatings for magnetic discs, say by application of a liquid magnetic pigment dispersion by the spin-coating method, a binder which does not suffer from the disadvantages of the known binders for this purpose, or at least suffers from them to a lesser degree, and which allows the production of firmly adhering magnetic coatings, even of less than $4\mu$ thickness, which have satisfactorily high mechanical resistance, on aluminum discs or on precoated aluminum discs.

We have now found that magnetic discs which have the desired advantageous properties can be manufactured by preparing a dispersion of finely divided magnetic pigment in a binder which essentially consists of a mixture of polycondensates with added volatile organic solvents and, optionally, added conventional additives, applying a coating of the liquid dispersion to the non-magnetic base disc and then drying and curing the applied magnetic coatings and subsequently grinding or polishing the surface of the latter, if the mixture of polycondensates employed as the binder for the magnetic pigment dispersion is a mixture of A. 60 to 70% by weight of a solid curable polycondensate of 2,2-bis(4-hydroxyphenyl)-propane and epichlorohydrin, with an epoxy equivalent weight from about 400 to 2,500, and having a melting point from about 50° to 150° C.

B. 10 to 30% by weight of a curable allyloxybenzene-formaldehyde condensate of the resol type with free methylol groups or methylol groups etherified with a lower alcohol, and having a molecular weight of less than 1,000, and C. 10 to 30% by weight of a curable melamine-formaldehyde condensate with more than two methylol groups etherified with n-butanol or iso-butanol, and having a molecular weight of less than 2,500. Furthermore, we have found that very advantageous products are also obtained if, in addition, 5 to 20, and especially 8 to 15, % by weight, based on the sum of the amounts of resins A, B and C, of polyvinyl methyl ether are added to the coating mixture.

Suitable curable solid polycondensates A of 2,2-bis(4-hydroxyphenyl)-propane and epichlorohydrin with an epoxy equivalent weight (number of grams containing 1 gram equivalent of epoxide) from about 400 to 2,500, especially from about 1,500, to 2,500, are the appropriate commercially available polycondensates and amongst these, in particular, solid polycondensates with a molecular weight of less than 4,000 and in particular from about 800 to about 3,000. A polycondensate of molecular weight 2,900, such as, for example, that sold by Shell Chemical Company under the tradename "R Epon 1007", and the product sold by the same company under the tradename "R Epon 1001", are particularly suitable.

The product marketed by General Electric Co. under the name "R Methylon 75108" may be mentioned as an example of a particularly suitable curable allyloxybenzene-formaldehyde condensate B.

Particularly suitable curable melamine-formaldeyde condensates C are precondensates obtained by reaction of 1 mole of melamine with more that 2, and especially 4 to 6, moles of formaldehyde in an alkaline medium, a higher proportion of the methylol groups being etherified with isobutanol or, preferably, with n-butanol. The BASF surface-coating resin "R Luwipal 030" is a suitable commercial product of this type.

A binder mixture which consists of 60-70% by weight of the epoxy resin A, 10-30% by weight of the condensate B and 10-30% by weight of the condensate C has proved particularly advantageous for the process according to the invention.

The product marketed by BASF under the tradename "R Lutanol M40" is an example of a suitable polyvinyl methyl ether.

Suitable magnetic pigments for the magnetic coating are the conventional materials such as magnetite ($Fe_3O_4$) and, preferably, acicular gamma-iron-(III) oxide ($\gamma$-$Fe_2O_3$) with average particle sizes from about 0.1 to $2\mu$. The amount by weight of the magnetic pigments is in general 0.5 to 3 times, and preferably about 0.8 to 1.5 times, the weight of the binder mixture used.

Of course, the magnetic coating can additionally contain conventional additives, for example dispersing auxiliaries or lubricants, in the conventional small amounts. It is of advantage to add to the magnetic coating, in the conventional way, hard non-magnetic powders of Mohs' hardness greater than 6 and of particle size approximately corresponding to from 0.5 to 1.5 times the final thickness of the magnetic coating, examples of such powders being corundum powder, non-magnetic iron oxide or boron carbide powder.

The solvents or solvent mixtures which can be used to prepare and apply the pigment binders are the conventional volatile solvents for surface-coating binders, for example aromatic hydrocarbons, such as xylene, alcohols and glycols, such as propanol or butanol, or their esters or ethers, such as ethylglycol acetate (ethylene glycol monoethyl ether monoacetate) or methylglycol acetate, ketones, such as acetone, ethers, such as tetrahydrofuran or dioxan, or strongly polar solvents such as dimethylformamide, and, of course, mixtures of such solvents. Suitable solvents for the preparation of the dispersion are, in particular, a mixture of ethylglycol acetate, dimethylformamide and xylene, or a similar mixture with cyclohexanone in place of xylene. The most advantageous weight ratio of the solvent components is approximately 1:1:1. Using a mixture in this ratio on the one hand ensures good wetting of the metallic base during the coating process and, on the other hand, ensures good solvent power for the binder system. In general, about 100 to 150 parts by weight of solvent are used per 100 parts by weight of binder and magnetic pigment together.

The conventional non-magnetic metallic base discs of aluminum or aluminum alloys, in the conventional sizes and thicknesses, can be used for the process according to the invention. For the manufacture of magnetic discs with thin magnetic coatings it is desirable to use base discs with polished surfaces. Discs which have a peak-to-valley height $R_t$ of about 0.01 to $0.1\mu$ (according to DIN 4,762) and which have again been cleaned with organic solvents before coating, are preferred. After baking and grinding and/or polishing, the magnetic discs according to the invention exhibit peak-to-valley heights $R_t$ of 0.01 to $0.05\mu$.

In some cases it is of advantage to use a metal disc of aluminum or aluminum alloys of which the surface has been polished and has approximately the abovementioned peak-to-valley heights, and which has been coated on one or both sides with a thin intermediate layer of coating resin, generally of 1 to $10\mu$ gauge, which is hard and preferably contains non-magnetic pigments. It is advantageous to use conventional curable binders for the intermediate layer of coating resin, and preferable to use the same, or similar, binders as those used for the magnetic coating, and it is advantageous to bake the intermediate layer of coating resin before polishing.

To prepare the magnetic dispersion, the mixture of the magnetic pigments, optionally with added hard non-magnetic pigments, of the curable binder and of a sufficient amount of solvent is, in general, dispersed by a conventional dispersing process (for example in a ball mill). Conventional methods can also be used for applying the magnetic dispersion to the base disc. A very suitable method has proved to be first to apply a layer of the magnetic dispersion to the slowly rotating base discs (for example rotating at a speed of about 100 to 500 rpm), for example by spraying, giving a thickness from about 1 to about 2 mm, and then to adjust the thickness of the magnetic coating to the desired value by rotating the disc at a higher speed, preferably from about 1,000 to 3,000 rpm. An example of an application technique which can be used is described in U.S. Pat. No. 2,913,246. In the preferred embodiment, the base discs are provided with the magnetic coating simultaneously on both sides, and are in general rotated, during application, in an inclined position, at an angle of about 45° to 80° to the horizontal. The process according to the invention, with coating on both sides, has proved particularly advantageous especially for the production of very thin magnetic coatings, especially where the magnetic coatings are less than $4\mu$, for example from 1.5 to $3\mu$, thick.

When the coating process has been completed, the magnetic coating is heated so as to cure or bake the magnetic coating. In this treatment, the coated base disc is advantageously heated at about 150° to 300° C and preferably about 200° to 250° C, in general for ¼ to 1 hour; the curing temperature and curing time can also be lowered by adding curing catalysts, such as phosphoric acid or hexahydrophthalic anhydride, to the magnetic dispersion, and this has proved particularly desirable when polyvinyl methyl ether is co-used.

Following the baking, the surface of the baked magnetic coating is ground and polished so as to achieve the desired low peak-to-valley height. It is advantageous to effect the grinding and polishing first with a fine diamond powder in the form of a paste, that is to say with added lapping oil, for example a paraffin oil of boiling point from about 120° to 240° C, the preferred maximum particle size of the diamond powder being from 5 to 8μ. Discs of a polyvinyl alcohol sponge, suitably with an average pore diameter of 0.5 to 5 mm, as the base material, have proved suitable for the polishing process, the rotating discs being pressed against the coating, during polishing, under a pressure of 0.02 to 2.0 kg/cm². The speed of rotation of the discs is generally about 40 to 200, and preferably 80 to 150, revolutions per minute. After grinding for about 1 to 5 minutes, th magnetic coating surfaces are then preferably polished once again, for example for about 0.5 to 3 minutes, using rotating felt discs and preferably co-using a very fine diamond powder of particle size less than 2μ and preferably less than 1μ. In an advantageous embodiment of the process, the resulting magnetic coatings, which have a final thickness of about 1 to 5μ and preferably less than 3μ, are again heated, suitably for at least ½ hour and preferably for ¾ to 1¼ hours, at 180° to 250° C.

The process according to the invention also allows the manufacture of magnetic discs with very thin magnetic coatings, for example with approximately 2μ thick magnetic coatings, which are particularly outstanding with regard to freedom from flaws, quiet flight when operated with flying heads, and resistance to mechanical stresses such as can occur in head landings. If, in place of the binder mixture according to the invention, the mixture used is, for example, merely a mixture of the stated epoxy resins with the stated melamine-formaldehyde resins in the weight ratio from 80:20 to 60:40, the magnetic dispersion can again be processed satisfactorily, but the resulting magnetic discs do not adequately withstand the mechanical stresses during operation. If the binder mixture used is merely a mixture of the stated epoxy resins with the stated allyloxybenzene-formaldehyde condensates in weight ratios from 80:20 to 60:40, it is hardly possible to produce flawless homogeneous magnetic coatings of 2μ thickness by means of the conventional methods of application. The same applies to the use of a mixture of 56 parts by weight of the stated epoxy resin, 32 parts by weight of the stated allyloxybenzene-formaldehyde condensate and 12 parts by weight of polyvinyl methyl ether, though this mixture gives relatively satisfactory results in the production of magnetic discs of which the magnetic coating is more than 4μ thick.

The parts and percentages in the examples which follow are by weight, unless stated otherwise. Parts by volume bear the same relation to parts by weight as the liter to the kilogram.

EXAMPLE 1

3,500 parts or rod-shaped gamma-iron-(III) oxide of average particle size 0.2–1μ and 4,500 parts of a solvent mixture of equal parts of ethylglycol acetate, dimethylformamide and cyclohexanone are introduced into a steel ball mill of 30,000 parts by volume capacity, containing 40,000 parts of steel balls approx. 6 mm in diameter. 4,900 parts of a 50% strength solution of a commercial polycondensate of 2,2-bis-(4-hydroxyphenyl)-propane and epichlorohydrin, of melting point from about 125° to 135° C and having an epoxy equivalent weight from about 1,900 to 2,500, in a mixture of equal parts of ethylgylcol acetate and toluene, and 100 parts of a commercial polysiloxane, are also added, and the mixture is dispersed for 40 hours. 525 parts of a commercial curable allyloxybenzene-formaldehyde condensate with a molecular weight of about 320, 955 parts of the (R) Luwipal 030 surface-coating resin mentioned earlier (as the melamine-formaldehyde condensate) in the form of a 55% strength solution of equal parts of n-butanol and xylene, and 3,300 parts of a mixture of equal parts of ethylglycol acetate, dimethylformamide and cyclohexanone are then added and the dispersion is mixed in the ball mill for a further 15 hours. When a dispersion which forms a homogeneous film has been produced, 660 parts of an electrocorundum paste are mixed in and the resulting dispersion is filtered through paper filters and stored, with stirring.

To produce the magnetic coating, the filtered dispersion is applied to both sides of anodized aluminum discs rotating in an inclined position, using the process described in German patent application No. P 21 57 650 (O.Z. 27,810), and the excess magnetic dispersion is spun off by increasing the speed of rotation of the disc to approx. 1,000 rpm. A homogeneous coating is obtained on both sides of the disc. The coatings are then cured in a heating zone at 200° to 220° C, ground, as described earlier, with a diamond powder paste on polyvinyl alcohol sponge, and are then polished. Magnetic coatings 2.0 to 2.2μ thick, of very low peak-to-valley height are obtained.

Mechanical wear resistance test:

The magnetic disc is brought to a speed of 2,400 rpm on a test drive unit. A ceramic body, in the shape of a write-and-read head, is allowed to fall synchronously from a distance of 5 mm onto the magnetic disc, with a force of 300 p. The head lands in a zone which is only 1/20 of the total track length (approx. 1 m). Even after more than 1,000 landings, the magnetic coating had not been perforated down to the aluminum. This good result is probably attributable to a combination of great hardness and high adhesion of the magnetic coating according to the invention. This good result was not obtained in comparative experiments with comparable commercial magnetic discs.

Electromagnetic test:

The magnetic recording media are tested for faults on a commercial disc tester (Single tester, model 336 of Messrs. Wabash, Phoenix, Ariz./USA). The number of faults, such as drop-out, drop-in, noise and modulation was, in the case of the magnetic discs produced according to Example 1, on average 15% below the values obtained in comparative experiments with comparable commercial magnetic discs.

The resolution was determined for track 400 at frequencies of 3.22 Mc/s and 1.61 Mc/s (3,600 rpm); this is known to be a criterion of whether a recording medium can be used for high recording densitites. The resolution of the discs produced according to Example 1 was about 67.7% (average from determinations carried out on 10 discs) whilst the corresponding values for two comparable commercial types of magnetic discs were 50.7% and 61.3% respectively.

EXAMPLE 2

A 1.9 mm thick lapped aluminum disc is provided with a non-magnetic intermediate layer by the spin-coating process, using a dispersion of 1,700 parts of non-magnetic polishing-grade red iron oxide, 25 parts of a polysiloxane, 1,200 parts of a 50% strength solution of the epoxy resin mentioned in Example 1, in ethylglycol acetate, 260 parts of trimethoxymethylphenol and 350 parts of a 33% strength paste of finely divided electrocorundum in the said epoxy resin solution. The coating is cured for about 2 hours at 200° C and then ground and polished as stated. The resulting disc carries an approx.

6μ thick intermediate layer having a peak-to-valley height from 0.05 to 0.1μ.

The base disc which has been treated in this way is then provided, as described in Example 1, with a 2.0 to 2.2μ thick magnetic coating. The values obtained when testing the magnetic discs in the way described in Example 1 are not worse than those recorded for the discs manufactured according to Example 1.

EXAMPLE 3

A mixture of 3,500 parts of the gamma-iron-(III) oxide mentioned in Example 1, 4,200 parts of a 50% strength solution of the epoxy resin mentioned in Example 1, in a mixture of 70% of cyclohexanone and 30% of xylene, 100 parts of a commercial polysiloxane and 4,500 parts of a mixture of equal parts of ethylglycol acetate, dimethylformamide and xylene is pre-dispersed for 40 hours in a porcelain ball mill having a capacity of 30,000 parts by volume and containing 18,000 parts of steatite balls. After adding 700 parts of the allyloxybenzene-formaldehyde condensate mentioned in Example 1, 640 parts of ® Luwipal 030 (as the melamine-formaldehyde condensate) in the form of a 55% strength solution in equal parts of n-butanol and xylene, 500 parts of a 70% strength solution of polyvinyl methyl ether in toluene and 3,600 parts of a mixture of equal parts of ethylglycol acetate, dimethylformamide and xylene, the mixture is dispersed for a further 15 hours. Shortly before terminating the dispersing operation, 660 parts of electrocorundum paste are mixed in. The further treatment and production of the dispersion are effected as in Example 1 and 2. The electromagnetic test results given by the magnetic discs obtained are similar to those of the magnetic discs manufactured according to Examples 1 and 2. When testing the resistance to mechanical wear, the head landing test showed that more than 2,000 landings still did not cause perforation of the magnetic coating through to the base.

We claim:
1. A magnetic recording disc which comprises a base and an adhesive magnetic coating composition thereon, said coating comprising a binder and finely divided magnetic pigment dispersed in said binder, said binder comprising a mixture of polycondensates consisting essentially of
   A. 60 to 70% by weight of a solid curable polycondensate of 2,2-bis-(4-hydroxyphenyl)-propane and epichlorohydrin, with and epoxy equivalent weight from about 400 to 2,500 and having a melting point from about 50° to 150° C,
   B. 10 to 30% by weight of a curable allyloxybenzene-formaldehyde condensate of the resol type with free methylol groups or methylol groups etherified with a lower alcohol, and having a molecular weight of less than 1,000, and
   C. 10 to 30% by weight of a curable melamine-formuladehyde condensate with more than two methylol groups etherified with n-butanol or isobutanol and having a molecular weight of less than 2,500.

2. A magnetic recording disc as set forth in claim 1 wherein said base is a non-magnetic, metallic disc selected from the group consisting of aluminum and aluminum alloy.

3. A magnetic recording disc as set forth in claim 2 wherein said disc has a polished, hard intermediate layer of a coating resin containing pigment.

4. A magnetic recording disc as set forth in claim 1 wherein said binder contains from 5 to 20% by weight, based on the sum of the amounts of the resins in A, B, and C of polyvinyl methyl ether.

5. A magnetic recording disc as set forth in claim 1 wherein said magnetic pigment is magnetite ($Fe_3O_4$).

6. A magnetic recording disc as set forth in claim 1 wherein said magnetic pigment is acicular gamma-iron-(III) oxide with average particle size from about 0.1 to 2μ.